(12) United States Patent
Nielsen et al.

(10) Patent No.: US 11,725,463 B2
(45) Date of Patent: *Aug. 15, 2023

(54) COUPLING FOR RODS

(71) Applicant: MATERION CORPORATION, Mayfield Heights, OH (US)

(72) Inventors: William D. Nielsen, Kingwood, TX (US); Diane M. Nielsen, Kingwood, TX (US); Fritz C. Grensing, Perrysburg, OH (US)

(73) Assignee: Materion Corporation, Mayfield Heights, OH (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/231,371

(22) Filed: Apr. 15, 2021

(65) Prior Publication Data

US 2021/0230946 A1 Jul. 29, 2021

Related U.S. Application Data

(63) Continuation of application No. 16/580,646, filed on Sep. 24, 2019, now Pat. No. 11,008,818, which is a
(Continued)

(51) Int. Cl.
*E21B 17/042* (2006.01)
*E21B 43/12* (2006.01)
(Continued)

(52) U.S. Cl.
CPC .............. *E21B 17/042* (2013.01); *C22C 9/06* (2013.01); *E21B 17/0426* (2013.01);
(Continued)

(58) Field of Classification Search
CPC .... E21B 17/04; E21B 17/042; E21B 17/0423; E21B 17/1071; F16D 1/02; F16D 2200/0026; F16D 2200/003
See application file for complete search history.

(56) References Cited

U.S. PATENT DOCUMENTS

| 620,265 A | 2/1899 | Windle |
| 1,452,937 A | 4/1923 | Shaffer |

(Continued)

FOREIGN PATENT DOCUMENTS

| CA | 2425091 A1 | 10/2004 |
| CA | 2469583 A1 | 12/2004 |

(Continued)

OTHER PUBLICATIONS

Cribb et al., "Spinodal copper alloy C72900—new high strength antifriction alloy system", Canadian Metallurgical Quarterly, vol. 50, No. 3, 2011, pp. 232-239.
(Continued)

*Primary Examiner* — Cathleen R Hutchins
(74) *Attorney, Agent, or Firm* — Cozen O'Connor

(57) ABSTRACT

A cold worked and spinodally-hardened copper alloy comprising from about 8 to about 20 wt % nickel, and from about 5 to about 11 wt % tin, the remaining balance being copper, and having a 0.2% offset yield strength of at least 75 ksi, is used to form a sucker rod coupling or subcoupling. Each coupling is formed from a core having two ends, each end having an internal thread. These box ends engage the pin of a sucker rod or other rod. The exterior surface of the core includes grooves running between the two ends.

19 Claims, 12 Drawing Sheets

Related U.S. Application Data continuation of application No. 14/633,593, filed on Feb. 27, 2015, now Pat. No. 10,435,955.

(60) Provisional application No. 62/065,275, filed on Oct. 17, 2014, provisional application No. 62/008,324, filed on Jun. 5, 2014.

(51) Int. Cl.
*C22C 9/06* (2006.01)
*F16L 15/00* (2006.01)
*C22C 9/02* (2006.01)

(52) U.S. Cl.
CPC ............ *E21B 43/121* (2013.01); *F16L 15/00* (2013.01); *C22C 9/02* (2013.01)

(56) References Cited

U.S. PATENT DOCUMENTS

| | | | |
|---|---|---|---|
| 1,607,941 A | 11/1926 | Bowser |
| 1,629,058 A | 5/1927 | Wilson |
| 2,049,265 A | 7/1936 | Kinney |
| 2,563,038 A | 8/1951 | Stanley |
| 2,601,478 A | 6/1952 | Weir |
| 2,690,934 A | 10/1954 | Holcombe |
| 3,201,158 A | 8/1965 | Meripol |
| 4,139,334 A | 2/1979 | Payne et al. |
| 4,406,561 A | 9/1983 | Ewing |
| 4,431,219 A | 2/1984 | Brewer et al. |
| 4,484,833 A | 11/1984 | Gallagher |
| 4,602,807 A | 7/1986 | Bowers |
| 4,641,976 A | 2/1987 | Kar |
| 4,668,117 A | 5/1987 | Bair |
| 4,772,246 A | 9/1988 | Wenzel |
| 4,822,201 A | 4/1989 | Iwasaki et al. |
| 4,823,456 A | 4/1989 | Gray |
| 4,905,760 A | 3/1990 | Gray |
| 5,119,876 A | 6/1992 | Sable |
| RE34,467 E | 12/1993 | Reeves |
| 5,334,268 A | 8/1994 | Hermanson et al. |
| 5,405,461 A | 4/1995 | Hermanson et al. |
| 6,371,224 B1 | 4/2002 | Freeman et al. |
| 6,413,326 B1 | 7/2002 | Rallis |
| 6,716,292 B2 | 4/2004 | Nielsen, Jr. et al. |
| 6,837,643 B2 | 1/2005 | Lauder |
| 7,168,924 B2 | 1/2007 | Beck et al. |
| 7,360,609 B1 | 4/2008 | Falgout, Sr. |
| 7,647,963 B2 | 1/2010 | Carstensen |
| 10,435,955 B2 | 10/2019 | Nielsen et al. |
| 2001/0000550 A1 | 5/2001 | Newman |
| 2002/0007879 A1 | 1/2002 | Nielsen, Jr. et al. |
| 2002/0076273 A1 | 6/2002 | Carstensen |
| 2002/0122722 A1 | 9/2002 | Bertin et al. |
| 2004/0174017 A1 | 9/2004 | Brill et al. |
| 2004/0228679 A1 | 11/2004 | Reavis et al. |
| 2005/0118364 A1 | 6/2005 | Guise et al. |
| 2006/0225891 A1 | 10/2006 | Adams et al. |
| 2006/0273601 A1 | 12/2006 | Carstensen |
| 2008/0035329 A1 | 2/2008 | Carstensen |
| 2009/0275415 A1 | 11/2009 | Prill et al. |
| 2011/0203790 A1 | 8/2011 | Carstensen |
| 2012/0074692 A1 | 3/2012 | Chelette et al. |
| 2012/0211237 A1 | 8/2012 | Rich |
| 2014/0311633 A1 | 10/2014 | Cribb et al. |
| 2015/0267477 A1 | 9/2015 | Nielsen et al. |
| 2015/0354287 A1 | 12/2015 | Nielsen et al. |
| 2015/0376996 A1 | 12/2015 | Downing |
| 2016/0060968 A1 | 3/2016 | Xie |
| 2016/0237796 A1 | 8/2016 | Stachowiak et al. |
| 2016/0376851 A1 | 12/2016 | Morrow |
| 2018/0112503 A1 | 4/2018 | Lane et al. |
| 2018/0163485 A1 | 6/2018 | Song et al. |
| 2018/0266190 A1 | 9/2018 | Nielsen, Jr. et al. |
| 2019/0128075 A1 | 5/2019 | Urech |
| 2019/0242197 A1 | 8/2019 | Grensing et al. |
| 2019/0360279 A1 | 11/2019 | Trowbridge et al. |

FOREIGN PATENT DOCUMENTS

| | | |
|---|---|---|
| CN | 102678064 A | 9/2012 |
| GB | 572089 A | 9/1945 |
| GB | 2126675 A | 3/1984 |
| JP | 57-187888 | 5/1981 |
| JP | S57-187888 U | 11/1982 |
| JP | S6314987 A | 1/1988 |
| JP | H11-506804 A | 6/1999 |
| JP | 2011/506804 A | 3/2011 |
| RU | 2077654 C1 | 4/1997 |
| RU | 2150040 C1 | 5/2000 |
| RU | 2348720 C2 | 3/2009 |
| RU | 2508415 C2 | 2/2014 |
| WO | 96/41033 A1 | 12/1996 |
| WO | 2011/005403 A1 | 1/2011 |
| WO | 2012/039700 A1 | 3/2012 |
| WO | 2013/053449 A2 | 4/2013 |
| WO | 2014/176357 A1 | 10/2014 |
| WO | 2015187217 A1 | 12/2015 |

OTHER PUBLICATIONS

Cribb et al., "Copper Spinodal Alloys: New technology enables production of larger copper parts with the high-strength spinodal structure", Advanced Materials & Processes, Nov. 2002, pp. 1-4.
Norris Couplings Accessories sucker rod specification sheet, date unknown.
Specification for Sucker Rods, Polished Rods and Liners, Couplings, Sinker Bars, Polished Rod Clamps, Stuffing Boxes, and Pumping Tees; American Petroleum Institute, API Specification 11B, 27$^{th}$ Edition, May 2010, Effective Date: Nov. 1, 2010.
First Office Action for Chinese Application No. 2022105059773 dated Sep. 29, 2022, 6 pages.
S. Ilangovan et al, "Effects of Tin on Hardness, Wear Rate and Coefficient of Friction of Case CU—NI—SN Alloys," Journal of Engineering Science and Technology, Feb. 1, 2013, pp. 34-43, vol. 8, No. 1, Amrita School of Enqineerino, Tamilnadu, India.
W. Raymond Cribb et al, "Performance Advances in Copper-Nickel-Tin Spinodal Alloys," Advanced Materials & Processes, Sep. 1, 2013, pp. 20-25.
International Search Report for PCT Application PCT/US2018/023385 dated Jun. 8, 2018.
International Search Report and Written Opinion in PCT/US2015/017985 dated Jun. 8, 2015.

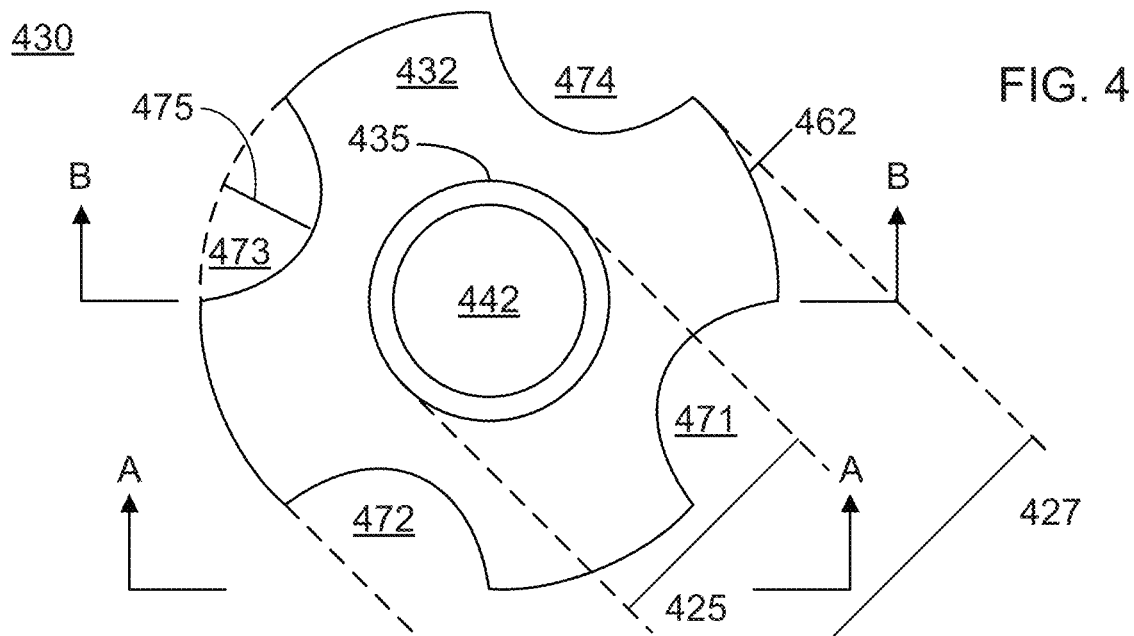
FIG. 4
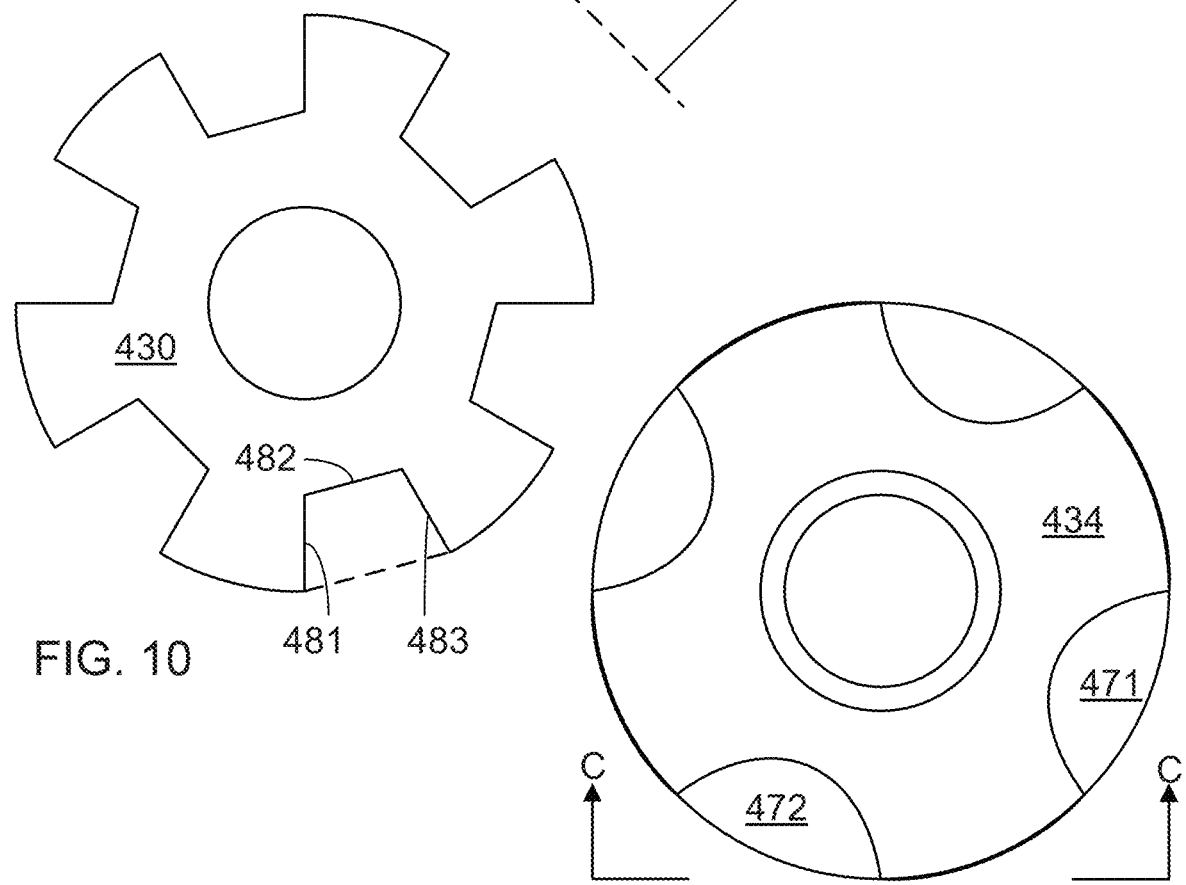
FIG. 10
FIG. 8

COUPLING FOR RODS

CROSS REFERENCE TO RELATED APPLICATIONS

This application is a continuation of U.S. application Ser. No. 16/580,646, filed Sep. 24, 2019, now U.S. Pat. No. 11,008,818 issued on May 18, 2021, which is a continuation of U.S. patent application Ser. No. 14/633,593, filed Feb. 27, 2015, now U.S. Pat. No. 10,435,955 issued on Oct. 8, 2019, which claims priority to U.S. Provisional Patent Application Ser. No. 62/008,324, filed Jun. 5, 2014, and U.S. Provisional Patent Application Ser. No. 62/065,275, filed Oct. 17, 2014. The content of the above applications are incorporated by reference in their entirety.

BACKGROUND

The present disclosure relates to couplings made from a spinodally-hardened copper alloy. The couplings are particularly useful for connecting sucker rods to affect a connection between a power source and a pump, and may also be useful for other couplings used in the oil and gas industry, such as a polished rod coupling or a subcoupling.

Hydrocarbon extraction apparatuses typically include a pump for extracting hydrocarbons from an underground reservoir, a power source for providing power to the pump, and a sucker rod lift system connecting the power source and the pump. The sucker rod lift system includes a series of sucker rods that are joined together by couplings. The sucker rods and couplings are joined by a pin-and-box threaded connection. Damage to threaded connections due to galling (wear due to adhesion between sliding surfaces) can compromise the mechanical integrity of the joint and lead to failure of the connection between the power source and the pump. In addition, the sucker rod lift system operates within a conduit. Damage to the conduit caused by repetitive contact between the outer surface of the coupling and the inner surface of the conduit can compromise the mechanical integrity of the conduit, leading to leakage of the hydrocarbons carried by the conduit into the environment. Such leakage effectively stops the pumping process and often leads to very costly additional operations to remediate such failures.

Desired characteristics of sucker rod couplings and similar couplings include high tensile strength, high fatigue strength, high fracture toughness, galling resistance, and corrosion resistance. Conventional couplings are typically comprised of steel or nickel alloys which lack the full complement of preferred intrinsic characteristics, particularly galling resistance. Expensive surface treatments are typically used to increase galling resistance on couplings made from steel or nickel alloys, as well as on the inside of the conduit inside which the coupling is disposed. These surface treatments eventually wear off, and must be re-applied periodically over the course of the lifetime of the parts in order to be effective.

It would be desirable to develop new sucker rod couplings having improved intrinsic galling resistance as well as other desirable properties.

BRIEF DESCRIPTION

The present disclosure relates to couplings made from spinodally-hardened copper alloys, and more specifically sucker rod couplings. The couplings have a unique combination of properties including high tensile strength, high fatigue strength, high fracture toughness, galling resistance, and corrosion resistance. This combination of properties delays the occurrence of destructive damage to the couplings and other components in pump systems using such couplings (e.g., sucker rods and conduits), while providing mechanical functionality during hydrocarbon recovery operations. This also extends the useful service life of such components, significantly reducing the costs of equipment used to recover hydrocarbons. Some couplings of this disclosure are especially shaped to include at least one groove on their exterior surface, so that fluid flow is not impeded.

Disclosed herein in various embodiments are couplings for a sucker rod, comprising a spinodally-hardened copper-nickel-tin alloy comprising from about 8 to about 20 wt % nickel, and from about 5 to about 11 wt % tin, the remaining balance being copper, wherein the alloy has a 0.2% offset yield strength of at least 75 ksi. The coupling is formed from a core having a first end and a second end, each end containing an internal thread. An exterior surface of the core includes at least one groove running from the first end to the second end.

The copper-nickel-tin alloy can comprise, in more specific embodiments, about 14.5 wt % to about 15.5 wt % nickel, and about 7.5 wt % to about 8.5% tin, the remaining balance being copper. The alloy may have a 0.2% offset yield strength of at least 85 ksi, or at least 90 ksi, or at least 95 ksi.

In particular embodiments, the alloy of the coupling can have a 0.2% offset yield strength of at least 95 ksi and a Charpy V-notch impact energy of at least 22 ft-lbs at room temperature. Alternatively, the alloy of the coupling can have a 0.2% offset yield strength of at least 102 ksi and a Charpy V-notch impact energy of at least 12 ft-lbs at room temperature. Alternatively, the coupling can have a 0.2% offset yield strength of at least 120 ksi and a Charpy V-notch impact energy of at least 12 ft-lbs at room temperature.

The internal threads on the first end and the second end of the coupling can have the same box thread size. Alternatively, for a subcoupling, the internal threads on the first end and the second end can have different box thread sizes.

Sometimes, a bore runs through the core from the first end to the second end, the internal threads of each end being located within the bore. Each end of the coupling can also include a counterbore at an end surface.

The internal threads can be formed by roll forming. The internal threads of the coupling may have a Rockwell C hardness (HRC) of about 20 to about 40. The coupling can be formed by cold working and spinodal hardening.

In some embodiments of the coupling, the at least one groove runs parallel to a longitudinal axis extending from the first end to the second end. In other embodiments, the at least one groove runs spirally from the first end to the second end, or in other words curls around the exterior surface. The groove(s) can have an arcuate cross-section or a quadrilateral cross-section In particular embodiments, the first end and the second end of the coupling are tapered downwards (i.e. the diameter at each end is less than the diameter in the middle of the coupling). For example, the ends can be tapered linearly or parabolically.

Also disclosed herein are rod strings, comprising: a first rod and a second rod, each rod including an end having a pin with an external thread; and a coupling having a structure as described above and herein. The internal thread of the first end of the coupling is complementary with the external thread of the first rod, and the internal thread of the second end of the coupling is complementary with the external thread of the second rod. Again, the coupling comprises a spinodally-hardened copper-nickel-tin alloy comprising from about 8 to about 20 wt % nickel, and from about 5 to about 11 wt % tin, the remaining balance being copper, wherein the alloy has a 0.2% offset yield strength of at least 75 ksi.

Also disclosed herein are pump systems comprising: a downhole pump; a power source for powering the downhole pump; and a rod string located between the downhole pump and the power source; wherein the rod string comprises: a first rod and a second rod, each rod including an end having a pin with an external thread; and a coupling as described herein.

Also disclosed herein in various embodiments are couplings for a sucker rod, comprising a spinodally-hardened copper-nickel-tin alloy comprising from about 8 to about 20 wt % nickel, and from about 5 to about 11 wt % tin, the remaining balance being copper, wherein the alloy has a 0.2% offset yield strength of at least 75 ksi.

The copper-nickel-tin alloy can comprise, in more specific embodiments, about 14.5 wt % to about 15.5 wt % nickel, and about 7.5 wt % to about 8.5% tin, the remaining balance being copper. The alloy may have a 0.2% offset yield strength of at least 85 ksi, or at least 90 ksi, or at least 95 ksi.

In particular embodiments, the alloy of the coupling can have a 0.2% offset yield strength of at least 95 ksi and a Charpy V-notch impact energy of at least 22 ft-lbs at room temperature. Alternatively, the alloy of the coupling can have a 0.2% offset yield strength of at least 102 ksi and a Charpy V-notch impact energy of at least 12 ft-lbs at room temperature. Alternatively, the coupling can have a 0.2% offset yield strength of at least 120 ksi and a Charpy V-notch impact energy of at least 12 ft-lbs at room temperature.

The coupling may include a core having a first end and a second end, each end containing an internal thread. The internal threads on the first end and the second end can have the same box thread size. Alternatively, for a subcoupling, the internal threads on the first end and the second end can have different box thread sizes.

Sometimes, a bore runs through the core from the first end to the second end, the internal threads of each end being located within the bore. Each end of the coupling can also include a counterbore at an end surface.

The internal threads can be formed by roll forming. The internal threads of the coupling may have a Rockwell C hardness (HRC) of about 20 to about 40. The coupling can be formed by cold working and spinodal hardening.

Also disclosed herein are rod strings, comprising: a first rod and a second rod, each rod including an end having a pin with an external thread; and a coupling including a core having a first end and a second end, each end containing an internal thread; wherein the internal thread of the first end of the coupling is complementary with the external thread of the first rod, and the internal thread of the second end of the coupling is complementary with the external thread of the second rod; and wherein the coupling comprises a spinodally-hardened copper-nickel-tin alloy comprising from about 8 to about 20 wt % nickel, and from about 5 to about 11 wt % tin, the remaining balance being copper, wherein the alloy has a 0.2% offset yield strength of at least 75 ksi.

Also disclosed herein are pump systems comprising: a downhole pump; a power source for powering the downhole pump; and a rod string located between the downhole pump and the power source; wherein the rod string comprises: a first rod and a second rod, each rod including an end having a pin with an external thread; and a coupling including a core having a first end and a second end, each end containing an internal thread; wherein the internal thread of the first end of the coupling is complementary with the external thread of the first rod, and the internal thread of the second end of the coupling is complementary with the external thread of the second rod; and wherein the coupling comprises a spinodally-hardened copper-nickel-tin alloy comprising from about 8 to about 20 wt % nickel, and from about 5 to about 11 wt % tin, the remaining balance being copper, wherein the alloy has a 0.2% offset yield strength of at least 75 ksi.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 4 is a plan view (i.e. looking down the longitudinal axis) of an exemplary sucker rod coupling of the present disclosure, having four grooves on the exterior surface of the core. The grooves have an arcuate cross-section.

FIG. 8 is a plan view of another sucker rod coupling of the present disclosure, having four grooves on the exterior surface of the core. The grooves have a spiral or helical cross-section.

FIG. 10 is a plan view of another sucker rod coupling of the present disclosure, having six grooves on the exterior surface of the core. The grooves have a quadrilateral cross-section.

DETAILED DESCRIPTION

Figure 1:
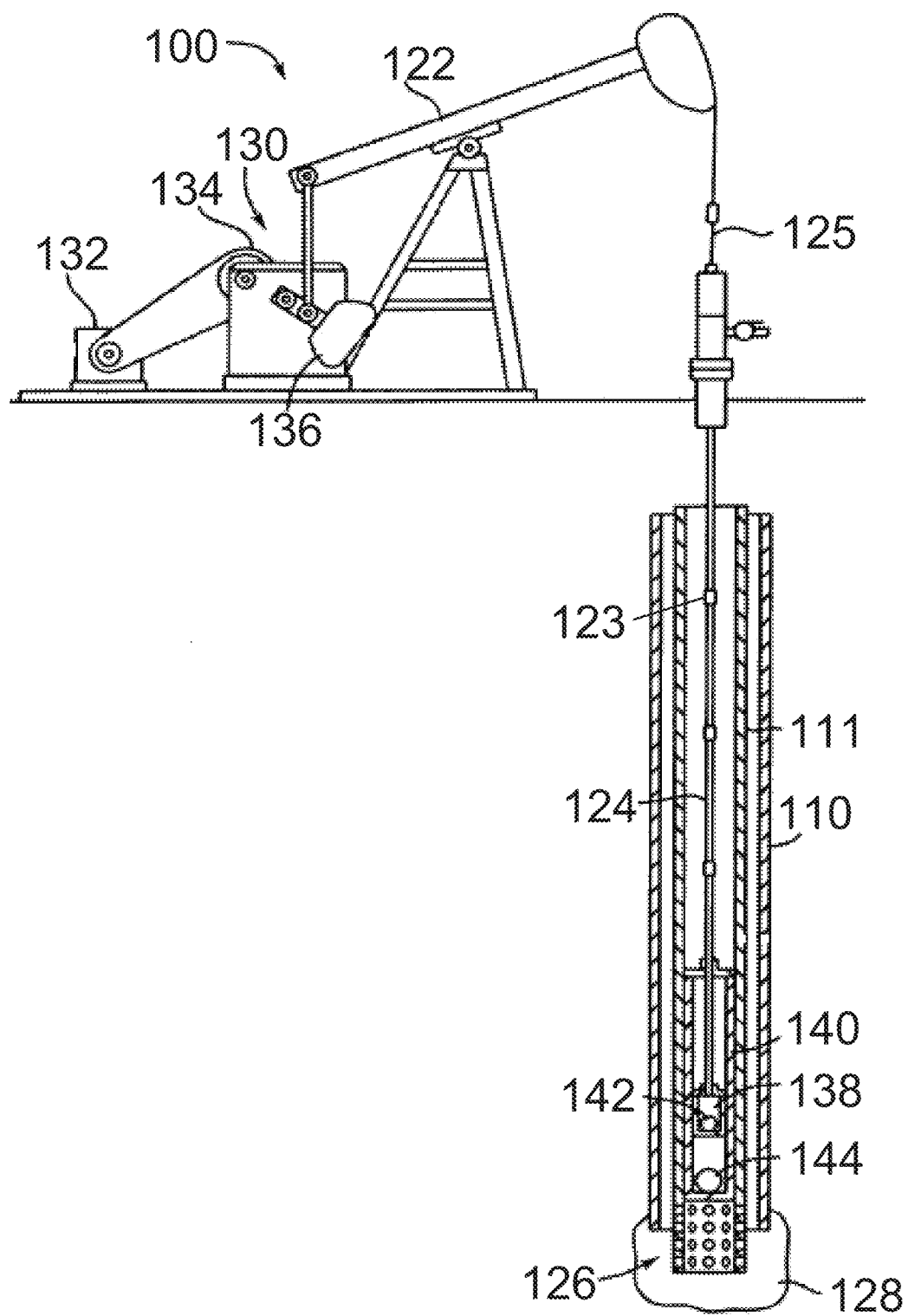
FIG. 1 is a schematic illustration of an embodiment of a pumping system of the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named components/steps and permit the presence of other components/steps. However, such description should be construed as also describing compositions or processes as "consisting of" and "consisting essentially of" the enumerated components/steps, which allows the presence of only the named components/steps, along with any impurities that might result therefrom, and excludes other components/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4." The term "about" may refer to plus or minus 10% of the indicated number.

The present disclosure relates to couplings that are made from a spinodally strengthened copper-based alloy. The copper alloys of the present disclosure may be copper-nickel-tin alloys that have a combination of strength, ductility, high strain rate fracture toughness, and galling protection. More particularly, the couplings are contemplated to be artificial lift couplings, sucker rod couplings, or subcouplings used in the oil and gas industry, particularly for hydrocarbon recovery systems.

FIG. 1 illustrates the various parts of a pump system 100. The system 100 has a walking beam 122 that reciprocates a rod string 124 that includes a polished rod portion 125. The rod string 124 is suspended from the beam for actuating a downhole pump 126 that is disposed at the bottom of a well 128.

The walking beam 122, in turn, is actuated by a pitman arm which is reciprocated by a crank arm 130 driven by a power source 132 (e.g., an electric motor) that is coupled to the crank arm 130 through a gear reduction mechanism, such as gearbox 134. The power source may be a three-phase AC induction motor or a synchronous motor, and is used to drive the pumping unit. The gearbox 134 converts motor torque to a low speed but high torque output for driving the crank arm 130. The crank arm 130 is provided with a counterweight 136 that serves to balance the rod string 124 suspended from the beam 122. Counterbalance can also be provided by an air cylinder such as those found on air-balanced units. Belted pumping units may use a counterweight that runs in the opposite direction of the rod stroke or an air cylinder for counterbalance.

The downhole pump 126 may be a reciprocating type pump having a plunger 138 attached to the end of the rod string 124 and a pump barrel 140 which is attached to the end of tubing in the well 128. The plunger 138 includes a traveling valve 142 and a standing valve 144 positioned at the bottom of the barrel 140. On the up stroke of the pump, the traveling valve 142 closes and lifts fluid, such as oil and/or water, above the plunger 138 to the top of the well and the standing valve 144 opens and allows additional fluid from the reservoir to flow into the pump barrel 140. On the down stroke, the traveling valve 142 opens and the standing valve 144 closes in preparation of the next cycle. The operation of the pump 126 is controlled so that the fluid level maintained in the pump barrel 140 is sufficient to maintain the lower end of the rod string 124 in the fluid over its entire stroke. The rod string 124 is surrounded by a conduit 111 which in turn is surrounded by a well casing 110. The rod string 124 below the polished rod portion 125 is made of sucker rods that are held together via sucker rod couplings 123.

Figure 2:
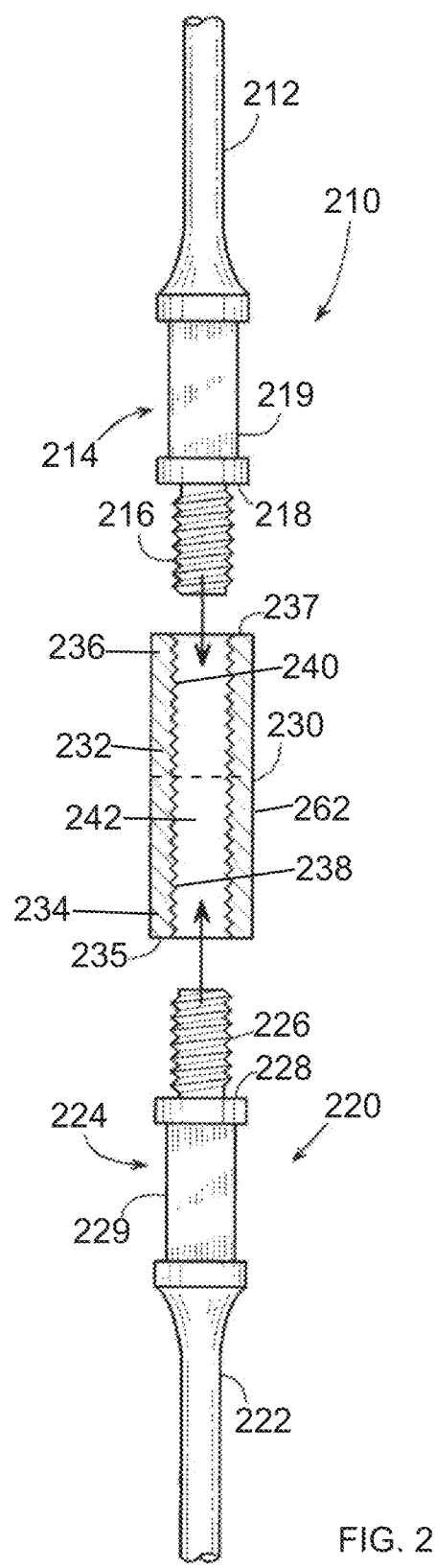
FIG. 2 is a cross-sectional view showing the engagement of a sucker rod coupling with two sucker rods.

FIG. 2 is a side view illustrating the engagement between two sucker rods 210, 220 and a sucker rod coupling. Each sucker rod 210, 220 includes a rod body 212, 222 and two rod ends 214, 224 (only one end shown for each rod). The rod end includes an externally-threaded pin (or male connector) 216, 226; a shoulder 218, 228 adapted to abut the end surface of the coupling; and a drive head 219, 229 which can be engaged by a tool for torquing and tightening the sucker rods.

The sucker rod coupling 230 itself is a core 232 having a first end 234 and a second end 236, each end corresponding to a box and having an internal thread (i.e. a female connector) 238, 240 for engaging the pin of a sucker rod. The core has a generally cylindrical shape, with the length being greater than the diameter. Each end has an end surface 235, 237 that abuts the shoulder of the sucker rod. As illustrated here, a bore 242 runs entirely through the core from the first end 234 to the second end 236 along the longitudinal axis of the core. Both internal threads 238, 240 are located on the surface of the bore, and a dotted line indicates where the two ends meet in the center of the core. Here, both internal threads have the same box thread size, and are complementary to the external threads on the sucker rods. The dimensions of the sucker rods and the various parts of the sucker rod coupling are defined by API Specification 11B, the 27th edition of which was issued in May 2010.

Figure 3A:
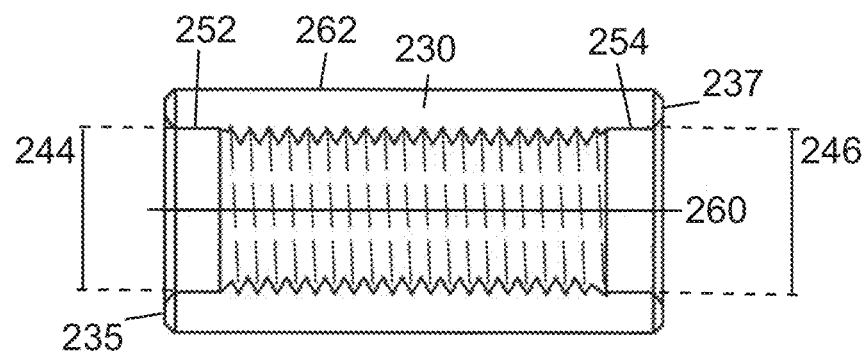
FIG. 3A is a cross-sectional view showing the interior of a sucker rod coupling.
Figure 3B:
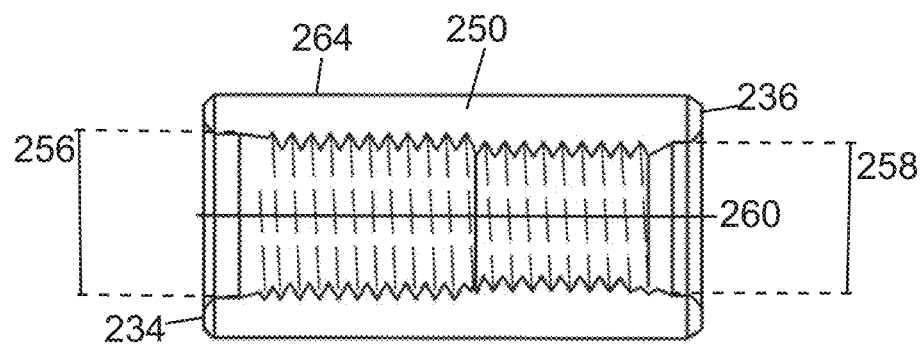
FIG. 3B is a cross-sectional view showing the interior of a subcoupling.

FIG. 3A provides a cross-sectional view of a sucker rod coupling 230, FIG. 3B is a cross-sectional view of a sub-coupling 250. The sucker rod coupling 230 of FIG. 3A includes a counterbore 252, 254 at each end surface 235, 237. Put another way, the internal thread does not run all the way to the end surface as in FIG. 2. Here, both internal threads have the same box thread size as indicated by reference numerals 244, 246. The longitudinal axis is also indicated by line 260.

The subcoupling 250 in FIG. 3B has the same structure as the sucker rod coupling, but differs in that the box thread size of the first end 234 is different from the box thread size of the second end 236, as indicated by reference numerals 256, 258. The longitudinal axis is also indicated by line 260.

In particular embodiments, the sucker rod coupling 230 of FIG. 2 and FIG. 3A, and the subcoupling 250 of FIG. 3B have substantially smooth curved exterior surfaces 262 and 264, respectively. In other words, the outer diameter remains constant along the length of these couplings such that curved exterior surfaces 262 and 264 are uniform. In particular embodiments, the outer diameter of these couplings is not significantly greater in diameter compared to the outer diameter of the sucker rods.

Figure 5:
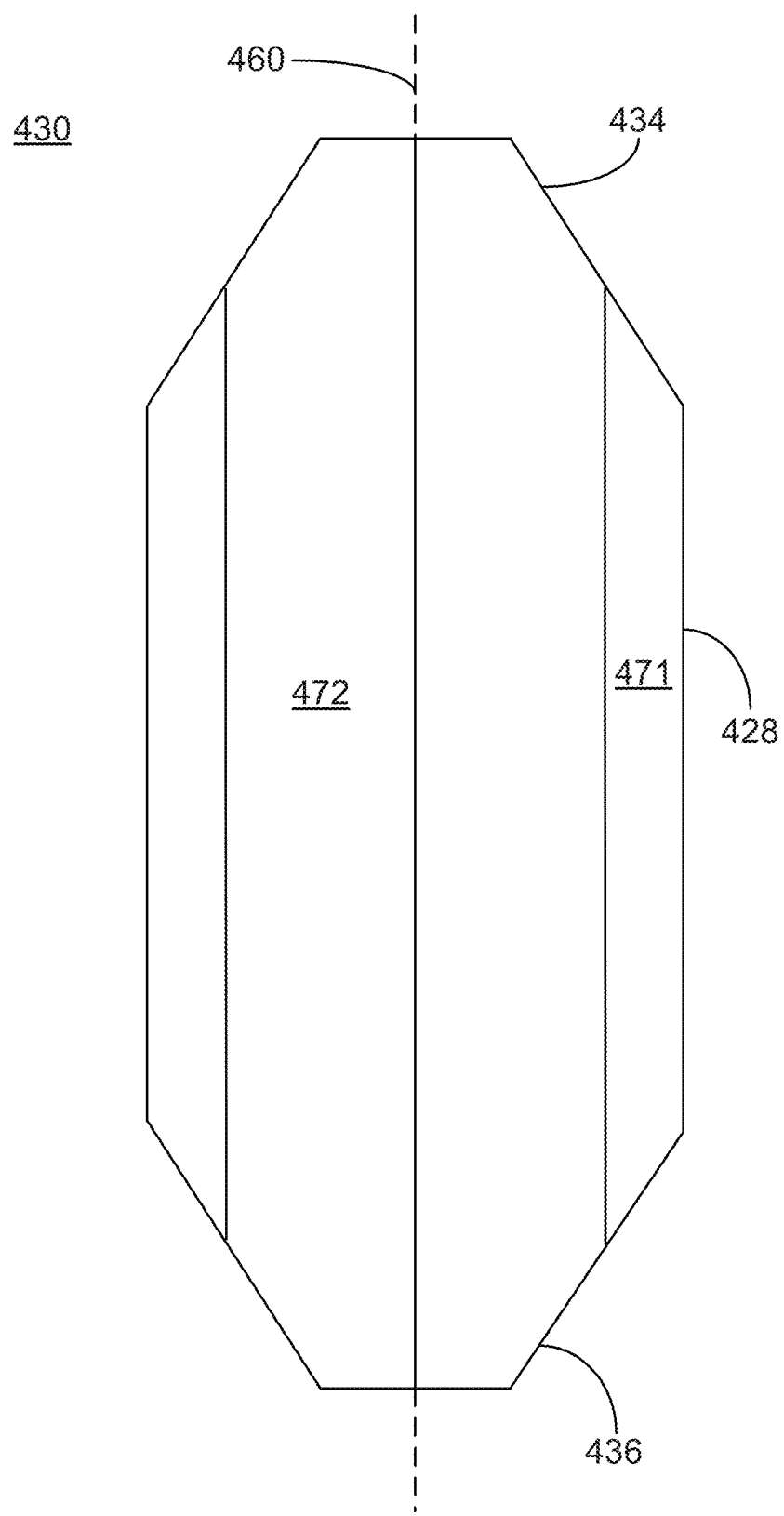
FIG. 5 is a side exterior view of the coupling taken along plane AA of FIG. 4. The grooves run parallel to a longitudinal axis extending between the two ends of the coupling. The ends of the coupling are linearly tapered.
Figure 6:
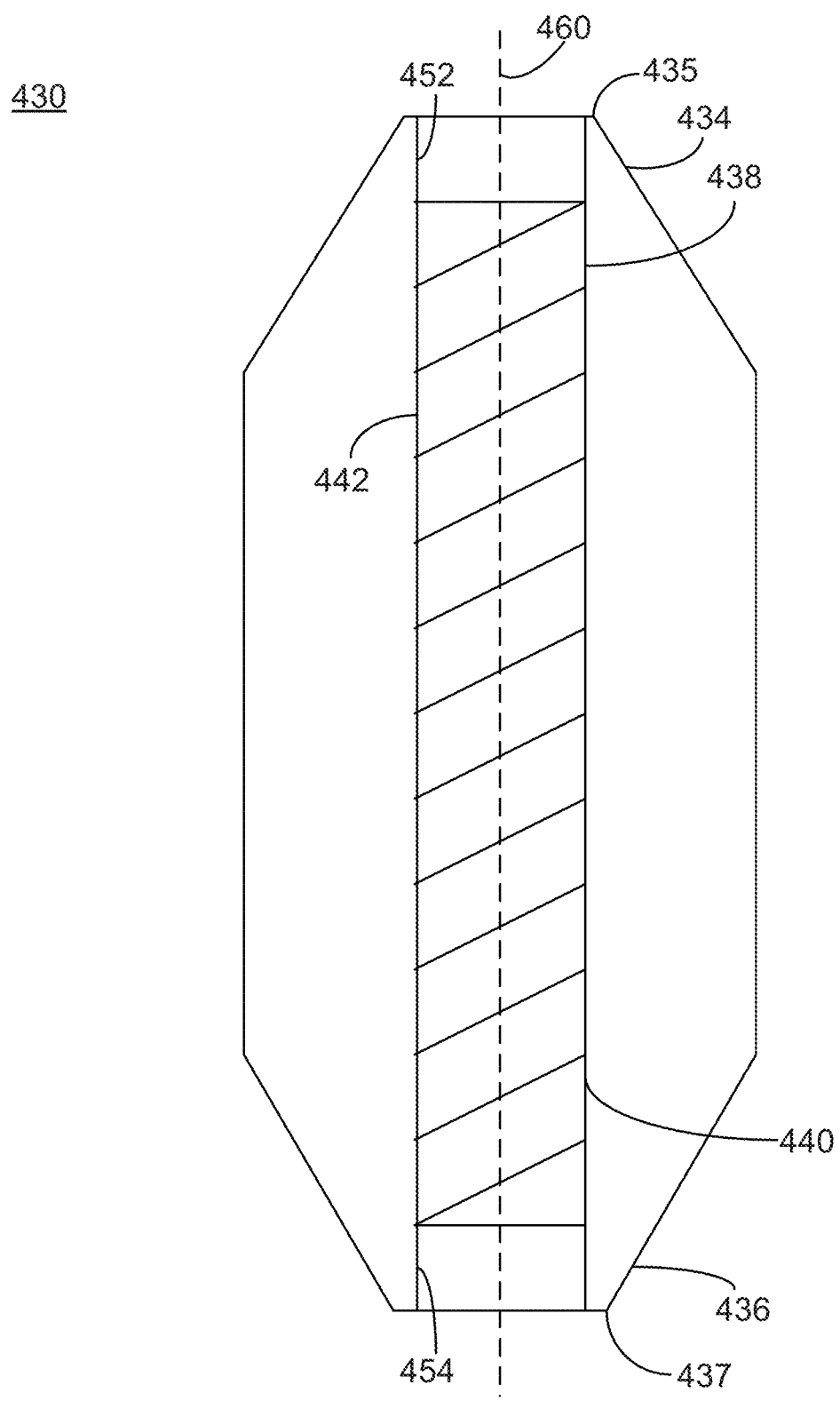
FIG. 6 is a side cross-sectional view of the coupling taken along plane BB of FIG. 4. This coupling includes a counterbore and internal threads.

Additional variations on such couplings are disclosed in FIGS. 4-6. More particularly, the outer diameter of these couplings is greater than the outer diameter of the sucker rods. This prevents the sucker rods from contacting the production tubing (i.e. conduit 111 of FIG. 1) surrounding the rod string. FIG. 4 is a plan view. FIG. 5 is an exterior view taken along plane AA of FIG. 4. FIG. 6 is a cross-sectional view taken along plane BB of FIG. 4.

Referring first to FIG. 4, the coupling 430 is formed from a core 432. The cross-section of the core has a generally circular shape, with a bore 442 running entirely through the core along the longitudinal axis. The exterior surface 462 of the core has at least one groove. Here, four grooves 471, 472, 473, 474 are shown. The core has an inner diameter 425 that also corresponds to the diameter of the bore, and the core also has an outer diameter 427. Each groove has a depth 475, which is measured relative to the outer diameter of the core. Each groove may have any desired depth, and there may be any number of grooves as well, as long as sufficient material remains of the core to support the rods that are joined to the coupling. In particular embodiments, the ratio of the groove depth 475 is at most one-half of the difference between the outer diameter 427 and the inner diameter 425. In particular embodiments, there is a plurality of grooves, and the grooves are generally spaced evenly around the perimeter of the core.

It is contemplated that the coupling desirably contacts any production tubing instead of the sucker rods doing so, so as to reduce wear on the sucker rods. One means of doing this is to increase the outer diameter of the sucker rod coupling. However, this could impede fluid flow within the production tubing. The presence of the grooves provides a path for fluid flow, reducing the cross-sectional area of the coupling and reducing any impedance in fluid flow due to the use of the coupling.

Referring now to the exterior view of FIG. 5, the coupling has a first end 434 and a second end 436, and a middle 428. The first end 434 and the second end 436 taper downwards, i.e. the diameter at the middle 428 is greater than the diameter at each end of the coupling. The term "taper" here refers only to the diameter decreasing from the middle to each end, and does not require the change in diameter to occur in any given manner. Here in FIG. 5, the ends of the core taper linearly, i.e. in a straight line. Grooves 471 and 472 are visible as well. Longitudinal axis 460 is also drawn for reference (dashed line).

Referring now to the cross-sectional view of FIG. 6, each end of the coupling 434, 436 corresponds to a box and has an internal thread (i.e. a female connector) 438, 440 for engaging the pin of a sucker rod. Each end has an end surface 435, 437 that abuts the shoulder of the sucker rod. The bore 442 runs entirely through the core from the first end 434 to the second end 436 along the longitudinal axis 460 of the core. Both internal threads 438, 440 are located on the surface of the bore. Here, both internal threads have the same box thread size. A counterbore 452, 454 is present at each end 434, 436, where the internal thread does not run all the way to the end surface.

Figure 7:
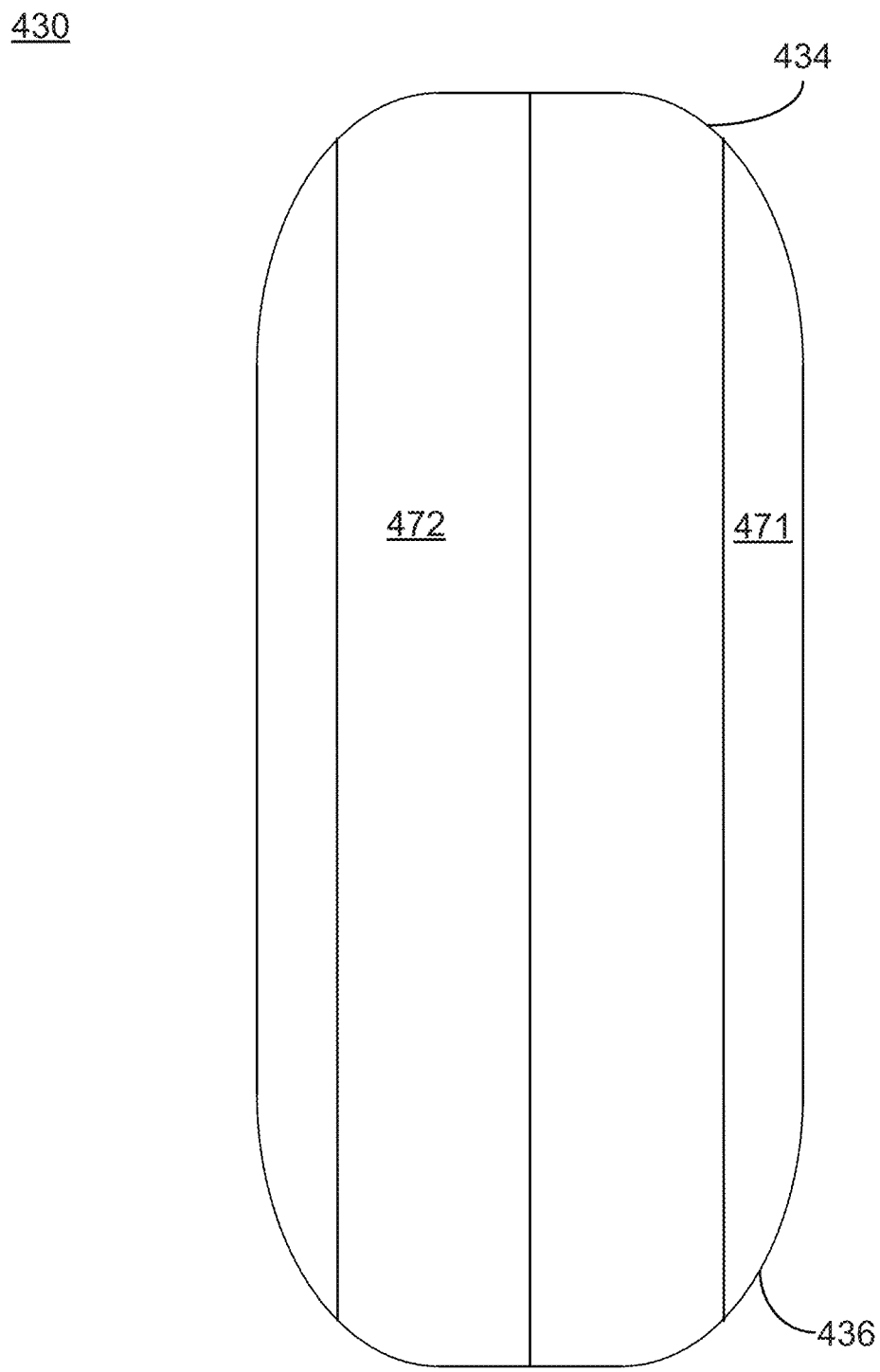
FIG. 7 is a side exterior view of another coupling taken along plane AA of FIG. 4. This coupling has the same plan view, but the exterior view is different. Here, the ends of the coupling are parabolically tapered.

FIG. 7 is another embodiment of a sucker rod coupling. Here, the coupling 430 has the same plan view as illustrated in FIG. 4, but the ends 434, 436 are tapered parabolically instead of linearly. The transition from the middle to each end is arcuate, when viewed from the side. Grooves 471 and 472 are still visible.

Figure 9:
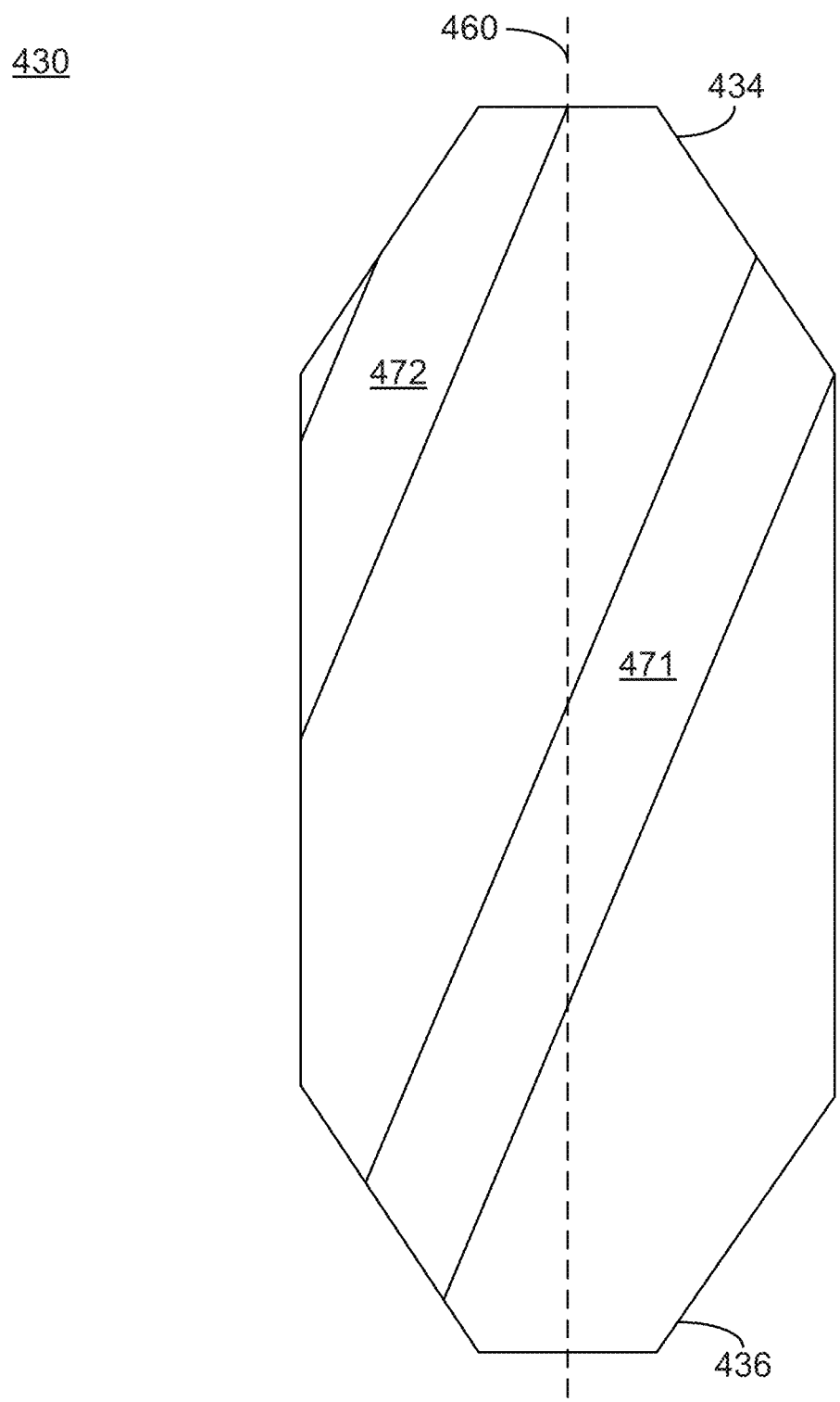
FIG. 9 is a side exterior view of the coupling taken along plane CC of FIG. 8. The grooves have a spiral cross-section, i.e. are angled relative to the longitudinal axis extending between the two ends of the coupling. The ends of the coupling are linearly tapered.

FIG. 8 and FIG. 9 illustrate another aspect of the present disclosure. FIG. 8 is the plan view, and FIG. 9 is the side view taken along plane CC of FIG. 8. Here, the grooves do not run parallel to the longitudinal axis 460. Rather, the grooves 471, 472 run spirally from the first end 434 to the second end 436, or put another way from one side of the perimeter to the other side of the perimeter, similar to threads on a screw. The distance along the longitudinal axis that is covered by one complete rotation of a groove (also called the lead) can be varied as desired.

Finally, FIG. 10 illustrates yet another aspect of the present disclosure. The cross-section of the groove can vary as desired, again as long as sufficient material remains of the core 430 to support the rods that are joined to the coupling. Here in FIG. 10, the groove 471 has a quadrilateral cross-section formed from three sides 481, 482, 483 (the fourth side is the perimeter of the core indicated by a dotted line). In contrast, the grooves of FIG. 4 have an arcuate cross-section.

Generally, the copper alloy used to form the couplings of the present disclosure has been cold worked prior to reheating to affect spinodal decomposition of the microstructure. Cold working is the process of mechanically altering the shape or size of the metal by plastic deformation. This can be done by rolling, drawing, pressing, spinning, extruding or heading of the metal or alloy. When a metal is plastically deformed, dislocations of atoms occur within the material. Particularly, the dislocations occur across or within the grains of the metal. The dislocations over-lap each other and the dislocation density within the material increases. The increase in over-lapping dislocations makes the movement of further dislocations more difficult. This increases the hardness and tensile strength of the resulting alloy while generally reducing the ductility and impact characteristics of the alloy. Cold working also improves the surface finish of the alloy. Mechanical cold working is generally performed at a temperature below the recrystallization point of the alloy, and is usually done at room temperature.

Spinodal aging/decomposition is a mechanism by which multiple components can separate into distinct regions or microstructures with different chemical compositions and physical properties. In particular, crystals with bulk composition in the central region of a phase diagram undergo exsolution. Spinodal decomposition at the surfaces of the alloys of the present disclosure results in surface hardening.

Spinodal alloy structures are made of homogeneous two phase mixtures that are produced when the original phases are separated under certain temperatures and compositions referred to as a miscibility gap that is reached at an elevated temperature. The alloy phases spontaneously decompose into other phases in which a crystal structure remains the same but the atoms within the structure are modified but remain similar in size. Spinodal hardening increases the yield strength of the base metal and includes a high degree of uniformity of composition and microstructure.

Spinodal alloys, in most cases, exhibit an anomaly in their phase diagram called a miscibility gap. Within the relatively narrow temperature range of the miscibility gap, atomic ordering takes place within the existing crystal lattice structure. The resulting two-phase structure is stable at temperatures significantly below the gap.

The copper-nickel-tin alloy utilized herein generally includes from about 9.0 wt % to about 15.5 wt % nickel, and from about 6.0 wt % to about 9.0 wt % tin, with the remaining balance being copper. This alloy can be hardened and more easily formed into high yield strength products that can be used in various industrial and commercial applications. This high performance alloy is designed to provide properties similar to copper-beryllium alloys.

More particularly, the copper-nickel-tin alloys of the present disclosure include from about 9 wt % to about 15 wt % nickel and from about 6 wt % to about 9 wt % tin, with the remaining balance being copper. In more specific embodiments, the copper-nickel-tin alloys include from about 14.5 wt % to about 15.5% nickel, and from about 7.5 wt % to about 8.5 wt % tin, with the remaining balance being copper.

Ternary copper-nickel-tin spinodal alloys exhibit a beneficial combination of properties such as high strength, excellent tribological characteristics, and high corrosion resistance in seawater and acid environments. An increase in the yield strength of the base metal may result from spinodal decomposition in the copper-nickel-tin alloys.

The copper alloy may include beryllium, nickel, and/or cobalt. In some embodiments, the copper alloy contains from about 1 to about 5 wt % beryllium and the sum of cobalt and nickel is in the range of from about 0.7 to about 6 wt %. In specific embodiments, the alloy includes about 2 wt % beryllium and about 0.3 wt % cobalt and nickel. Other copper alloy embodiments can contain a range of beryllium between approximately 5 and 7 wt %.

In some embodiments, the copper alloy contains chromium. The chromium may be present in an amount of less than about 5 wt % of the alloy, including from about 0.5 wt % to about 2.0 wt % or from about 0.6 wt % to about 1.2 wt % of chromium.

In some embodiments, the copper alloy contains silicon. The silicon may be present in an amount of less than 5 wt %, including from about 1.0 wt % to about 3.0 wt % or from about 1.5 wt % to about 2.5 wt % of silicon.

The alloys of the present disclosure optionally contain small amounts of additives (e.g., iron, magnesium, manganese, molybdenum, niobium, tantalum, vanadium, zirconium, and mixtures thereof). The additives may be present in amounts of up to 1 wt %, suitably up to 0.5 wt %. Furthermore, small amounts of natural impurities may be present. Small amounts of other additives may be present such as aluminum and zinc. The presence of the additional elements may have the effect of further increasing the strength of the resulting alloy.

In some embodiments, some magnesium is added during the formation of the initial alloy in order to reduce the oxygen content of the alloy. Magnesium oxide is formed which can be removed from the alloy mass.

In particular embodiments, the internal threads of the coupling are formed by roll forming, rather than by cutting. This process appears to elongate the grains on the outer surface of the threads. Rolled threads have been found to resist stripping because shear failures must take place across the grain, rather than with the grain. This cold working process also provides additional strength and fatigue resistance. As a result, the internal threads may have a Rockwell C hardness (HRC) of about 20 to about 40. The HRC can vary throughout the thread, and this recitation should not be construed as requiring the entire thread to have the same HRC. In particular embodiments, the HRC of the thread is a minimum of 22. The outer surface of the thread may have an HRC of at least 35.

The alloys used for making the couplings of the present disclosure may have a 0.2% offset yield strength of at least 75 ksi, including at least 85 ksi, or at least 90 ksi, or at least 95 ksi.

The alloys used for making the couplings of the present disclosure may have a combination of 0.2% offset yield strength and room temperature Charpy V-Notch impact energy as shown below in Table 1. These combinations are unique to the copper alloys of this disclosure. The test samples used to make these measurements were oriented longitudinally. The listed values are minimum values (i.e. at least the value listed), and desirably the offset yield strength and Charpy V-Notch impact energy values are higher than the combinations listed here. Put another way, the alloys have a combination of 0.2% offset yield strength and room temperature Charpy V-Notch impact energy that are equal to or greater than the values listed here.

TABLE 1

| 0.2% Offset Yield Strength (ksi) | Ultimate Tensile Strength (ksi) | Elongation at break (%) | Room Temperature Charpy V-Notch Impact Energy (ft-lbs) | Preferred Room Temperature Charpy V-Notch Impact Energy (ft-lbs) |
| --- | --- | --- | --- | --- |
| 120 | 120 | 15 | 12 | 15 |
| 102 | 120 | 15 | 12 | 20 |
| 95 | 106 | 18 | 22 | 30 |

Table 2 provides properties of another exemplary embodiment of a copper-based alloy suitable for the present disclosure for use in a sucker rod coupling or subcoupling.

TABLE 2

|  | 0.2% Offset Yield Strength (ksi) | Ultimate Tensile Strength (ksi) | Elongation at break (%) | Charpy V-Notch Impact Energy (ft-lbs) |
| --- | --- | --- | --- | --- |
| Average | 161 | 169 | 6 | N/A |
| Minimum | 150 | 160 | 3 | N/A |

The rod couplings of the present disclosure can be made using casting and/or molding techniques known in the art.

The couplings made of the spinodally-decomposed copper alloys uniquely have high tensile and fatigue strength in combination with high fracture toughness, galling resistance, and corrosion resistance. The unique combination of properties allows the couplings to satisfy basic mechanical and corrosion characteristics needed while reliably protecting system components from galling damage, thereby greatly extending the lifetime of the system and reducing the risk of unanticipated failure.

Another type of artificial lift coupling is used in the drive shaft of an artificial lift pump powered by a submersible electric motor that is disposed in the well bore or is disposed outside of the well bore. The couplings are used to join segments of the pump drive shaft together and to join the drive shaft to the motor and to the pump impeller. These couplings also include a keyway feature to assure a sound connection between parts. The keyway feature can increase localized stress and is a potential origin source of a crack under torsional load, particularly when starting the motor. Such a failure can be mitigated by using the copper alloys of the present disclosure, which have high strain rate fracture toughness.

The following examples are provided to illustrate the couplings, processes, and properties of the present disclosure. The examples are merely illustrative and are not intended to limit the disclosure to the materials, conditions, or process parameters set forth therein.

EXAMPLES

Figure 11:
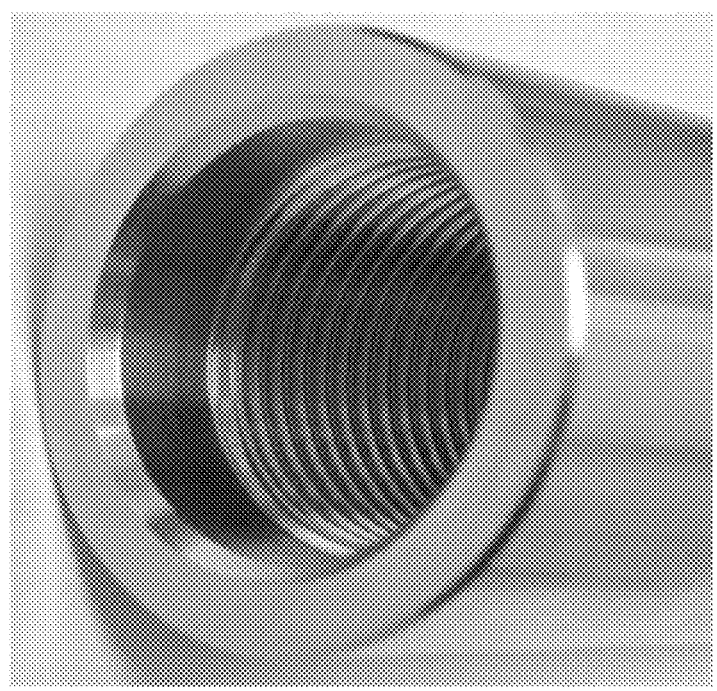
FIG. 11 is a picture of one end of a sucker rod coupling made from a copper alloy according to the present disclosure.

Two sucker rod couplings were made from a spinodally hardened copper alloy. The copper alloy was 15.1 wt % nickel, 8.2 wt % tin, 0.23 wt % manganese, and contained less than 0.05 wt % Nb, less than 0.02 wt % of Zn and Fe, and less than 0.01 wt % of Mg and Pb. The copper alloy had a 0.2% offset yield strength of 102 ksi, and an ultimate tensile strength of 112 ksi. The coupling had a nominal size of 1 inch according to API Specification 11B. The threads were roll formed using a tap for the operation. FIG. 11 is a picture of one end of the coupling.

Figure 12:
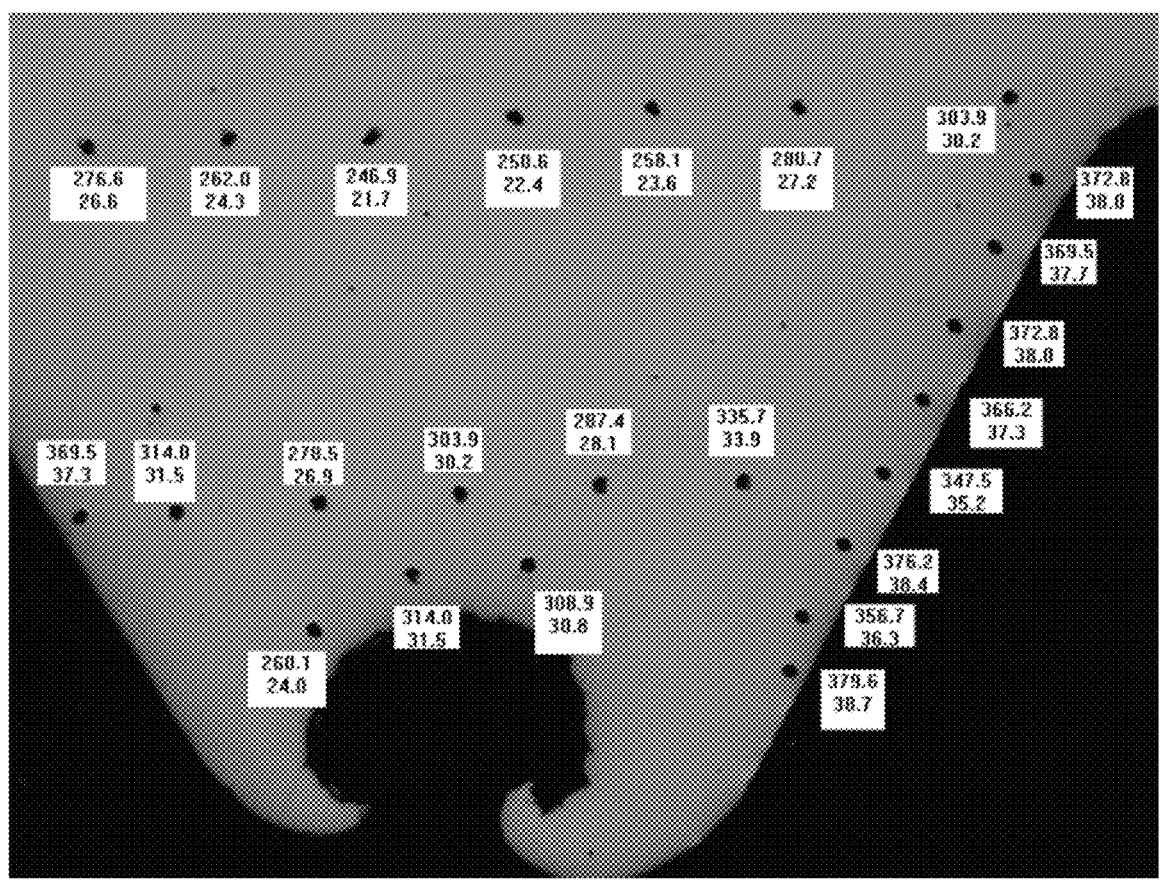
FIG. 12 is a picture showing the measured hardness across an internal thread of a coupling made from a copper alloy according to the present disclosure (50×).

Destructive testing was performed. A sample was sawed in half and the threads were mounted and polished for analysis. A hardness test was performed at various locations on the part. FIG. 12 is a picture indicating the measured values. The measured Vickers hardness (HV) is reported on top, and the Rockwell C hardness (HRC) is reported on the bottom (converted from the HV). As seen here, the HRC varied from a low of 21.7 at the interior of the thread to a high of 38.7 at the outer surface of the thread. All of the HRC values on the outer surface of the thread were above 35. The average grain size was 23 microns. The grains were elongated on the outer surface of the threads.

Figure 13:
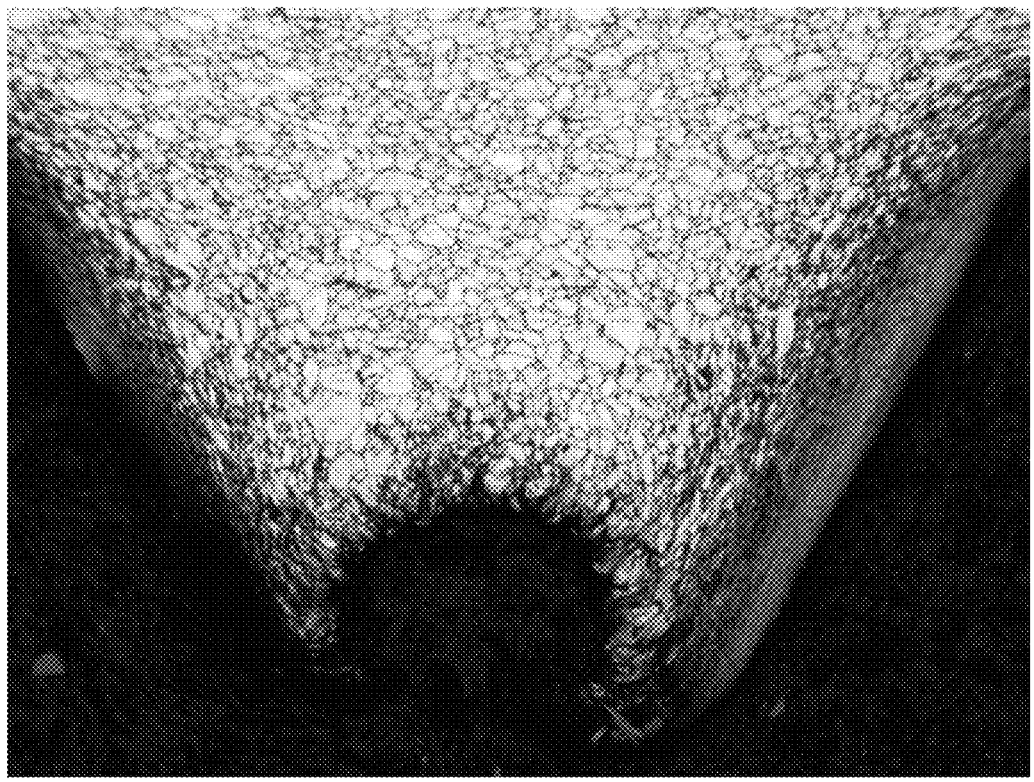
FIG. 13 is a micrograph at 50× magnification showing the grain structure of the entire thread.
Figure 14:
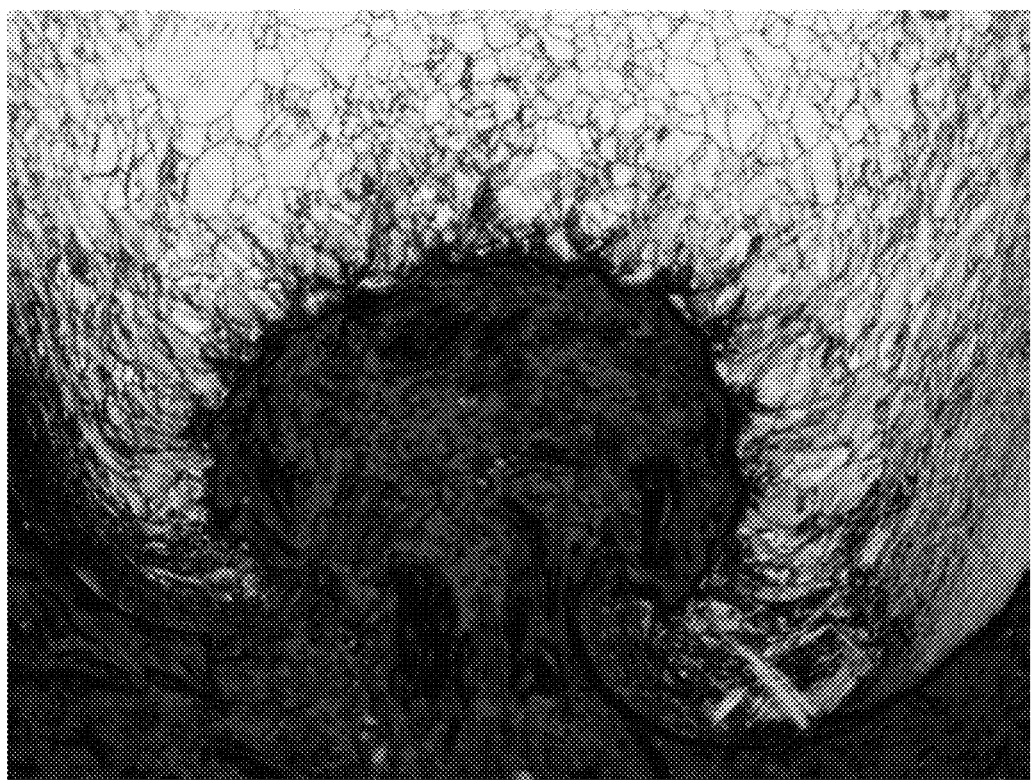
FIG. 14 is a micrograph at 100× magnification showing the grain structure of the tip of the thread.
Figure 15:
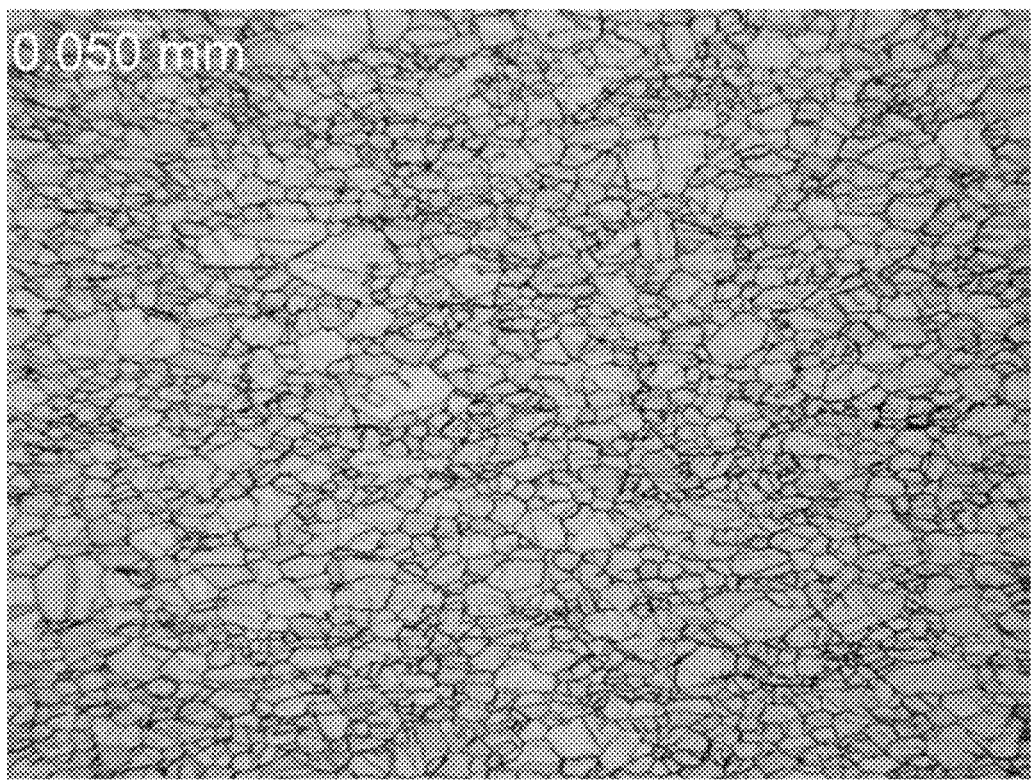
FIG. 15 is a micrograph at 100× magnification showing the grain structure at the center of the thread.
Figure 16:
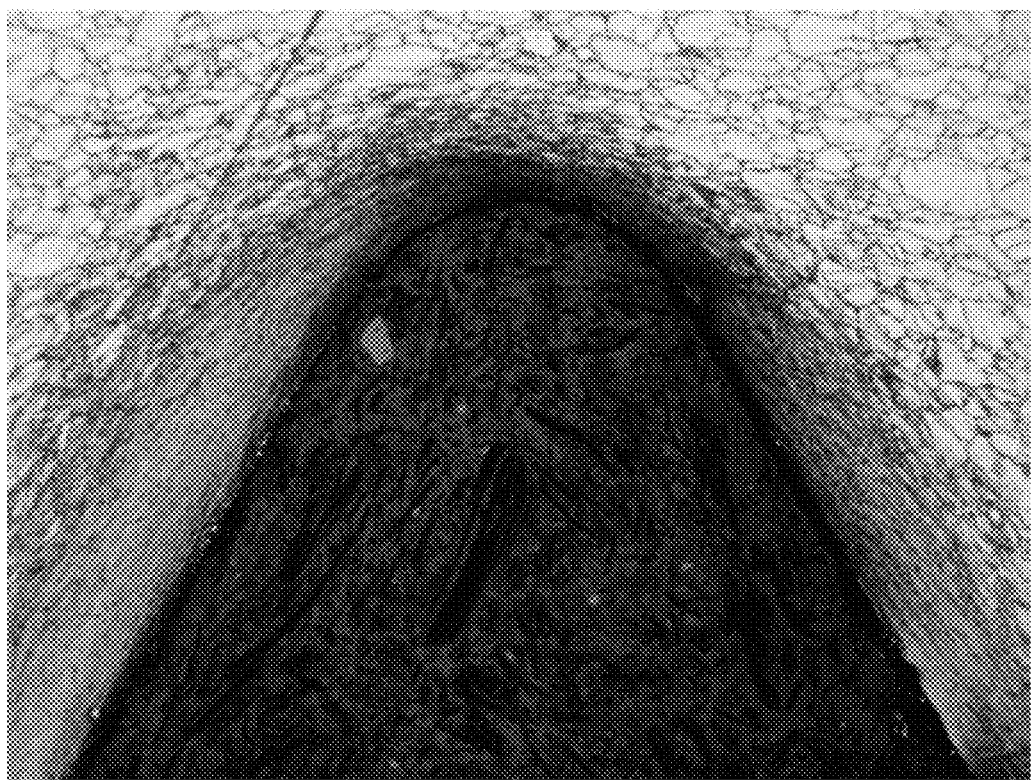
FIG. 16 is a micrograph at 100× magnification showing the grain structure at the thread root.
Figure 17:
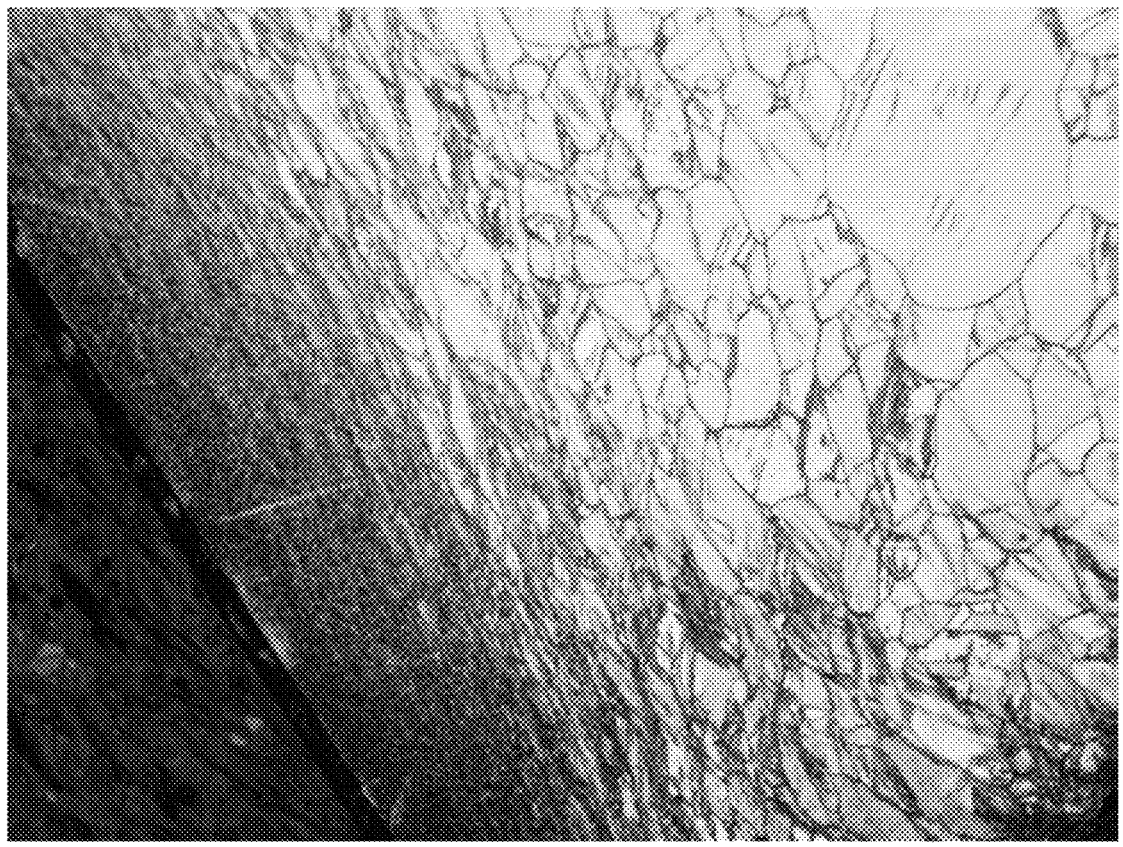
FIG. 17 is a micrograph at 200× magnification showing the grain structure at the side of the thread.

FIGS. 13-17 are various micrographs of the sample. FIG. 13 is a micrograph at 50× magnification showing the grain structure of the entire thread. FIG. 14 is a micrograph at 100× magnification showing the grain structure of the tip of the thread. FIG. 15 is a micrograph at 100× magnification showing the grain structure at the center of the thread. FIG. 16 is a micrograph at 100× magnification showing the grain structure at the thread root. FIG. 17 is a micrograph at 200× magnification showing the grain structure at the side of the thread.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. A drilling component for use in oil and gas production comprising:

a spinodally-hardened copper-nickel-tin alloy including from about 8 wt % to about 20 wt % nickel and from about 5 wt % to about 11 wt % tin.

2. The drilling component according to claim 1, wherein the drilling component includes a connector, a coupling, a bushing, a bearing, a tubing, or combinations thereof.

3. The drilling component according to claim 2, wherein the drilling component is a coupling for a sucker rod.

4. The drilling component according to claim 3, wherein the hydrocarbon extraction is performed at a temperature ranging from −193° F. to 572° F.

5. The drilling component according to claim 2, wherein the drilling component is for use in hydrocarbon extraction.

6. The drilling component according to claim 1, wherein the spinodally-hardened copper-nickel-tin alloy has a toughness as measured by Charpy V-notch impact energy of at least 22 ft-lbs at room temperature.

7. The drilling component according to claim 1, wherein the spinodally-hardened copper-nickel-tin alloy has a Yield Strength 0.2% offset of at least 75 ksi and an Ultimate Tensile Strength of at least 105 ksi.

8. The drilling component according to claim 1, wherein the spinodally-hardened copper-nickel-tin alloy has an Elongation at break of about 3% to about 18%.

9. The drilling component according to claim 1, wherein the spinodally-hardened copper-nickel-tin alloy has a Hardness (HRC) of about 22 to about 38.

10. The drilling component according to claim 1, wherein the spinodally-hardened copper-nickel-tin alloy has a Hardness (HRB) of about 93 to about 111.

11. The drilling component according to claim 1, wherein the spinodally-hardened copper-nickel-tin alloy has a Yield Strength 0.2% offset of about 90 ksi to about 150 ksi.

12. The drilling component according to claim 1, wherein the spinodally-hardened copper-nickel-tin alloy has an Ultimate Tensile Strength of about 105 ksi to about 160 ksi.

13. The drilling component according to claim 1, wherein the spinodally-hardened copper-nickel-tin alloy includes from about 14.5 wt % to about 15.5 wt % nickel, and from about 7.5 wt % to about 8.5 wt % tin.

14. The drilling component according to claim 13, wherein the drilling component is a coupling and the coupling has a core including the spinodally-hardened copper-nickel-tin alloy, the core having a first end and a second end, each end containing an internal thread, wherein the internal threads have a Hardness (HRC) of 22 to 38.

15. The drilling component according to claim 13, the spinodally-hardened copper-nickel-tin alloy having:
a Yield Strength 0.2% offset of at least 90 ksi,
an Ultimate Tensile Strength of at least 105 ksi, and
an Elongation at break of about 3% to about 18%, and
a Hardness (HRC) of about 22 to about 38.

16. A rod string comprising:
a first rod and a second rod, each rod including an end with an external thread; and
the drilling component of claim 1, wherein the drilling component is a coupling and the coupling has a core including the spinodally-hardened copper-nickel-tin alloy, the core having a first end and a second end, each end containing an internal thread, the internal thread of the first end of the drilling component complementary with the external thread of the first rod and the internal thread of the second end of the drilling component complementary with the external thread of the second rod, wherein the internal threads have a Hardness (HRC) of at least about 22.

17. The rod string according to claim 16, the drilling component including spinodally-hardened copper-nickel-tin alloy including from about 14.5 wt % to about 15.5 wt % nickel, and from about 7.5 wt % to about 8.5 wt % tin.

18. A pump system comprising:
   a downhole pump;
   a power source for powering the downhole pump; and
   a rod string located between the downhole pump and the power source; wherein the rod string comprises:
      a first rod and a second rod, each rod including an end with an external thread;
      the drilling component of claim 1, wherein the drilling component is a coupling and the coupling has a core including the spinodally-hardened copper-nickel-tin alloy, the core having a first end and a second end, each end containing an internal thread, the internal thread of the first end of the drilling component complementary with the external thread of the first rod and the internal thread of the second end of the drilling component complementary with the external thread of the second rod, wherein the internal threads have a Hardness (HRC) of at least about 22.

19. The pump system according to claim 18, the drilling component including spinodally-hardened copper-nickel-tin alloy including from about 14.5 wt % to about 15.5 wt % nickel, and from about 7.5 wt % to about 8.5 wt % tin.

* * * * *